July 3, 1928.
A. E. PAIGE
1,675,862
SURFACING MECHANISM
Filed July 16, 1921
5 Sheets-Sheet 2
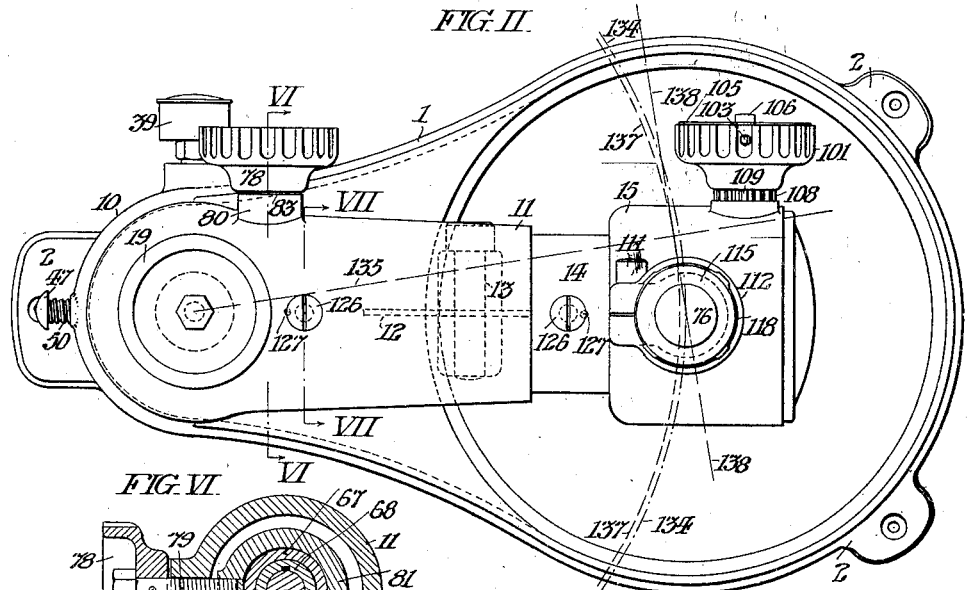
FIG. II.
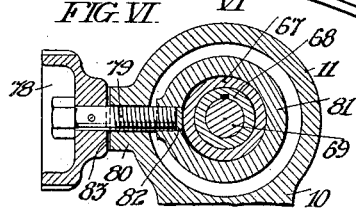
FIG. VI.
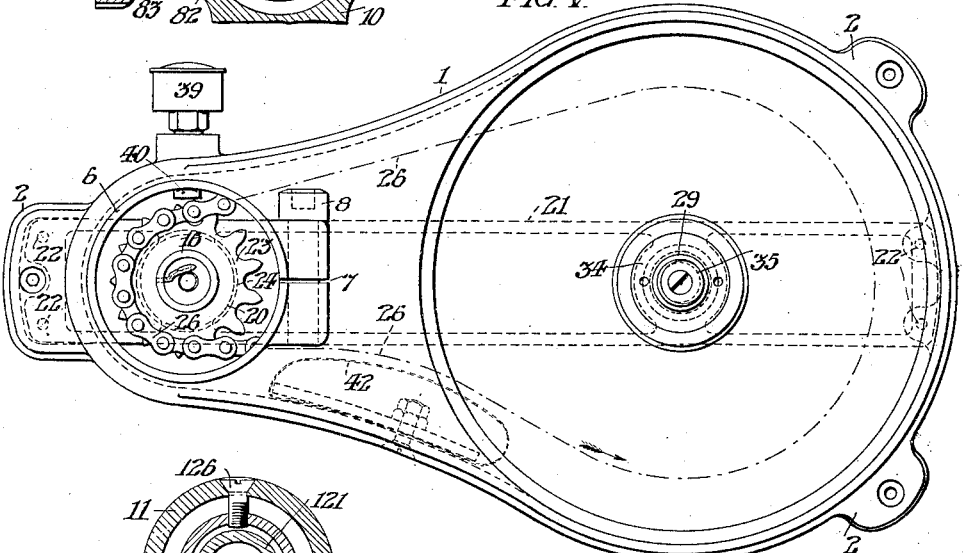
FIG. V.
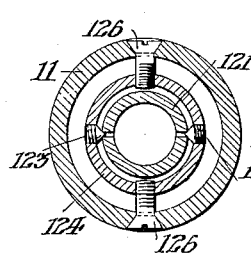
FIG. VII.
INVENTOR:
Arthur E. Paige

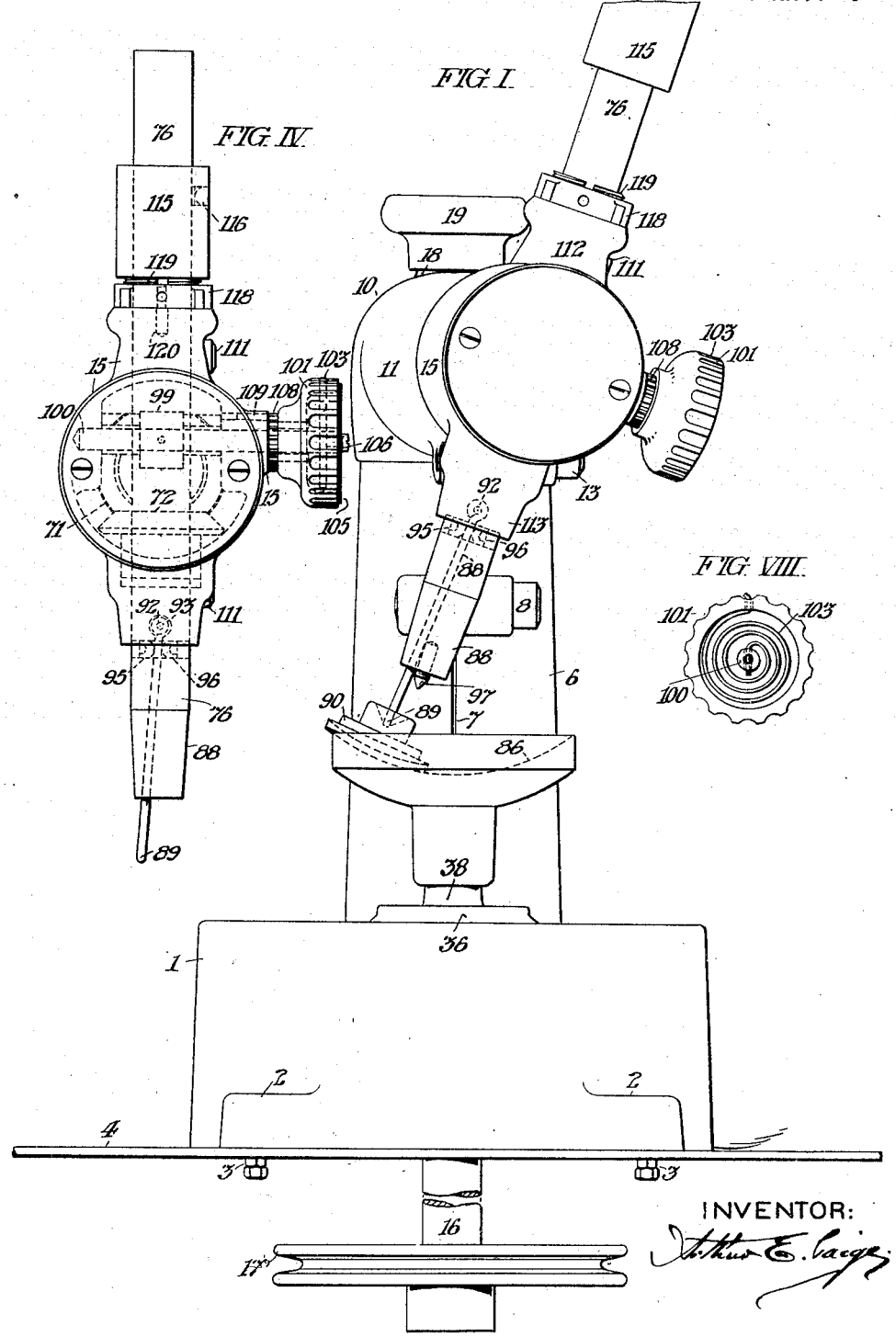

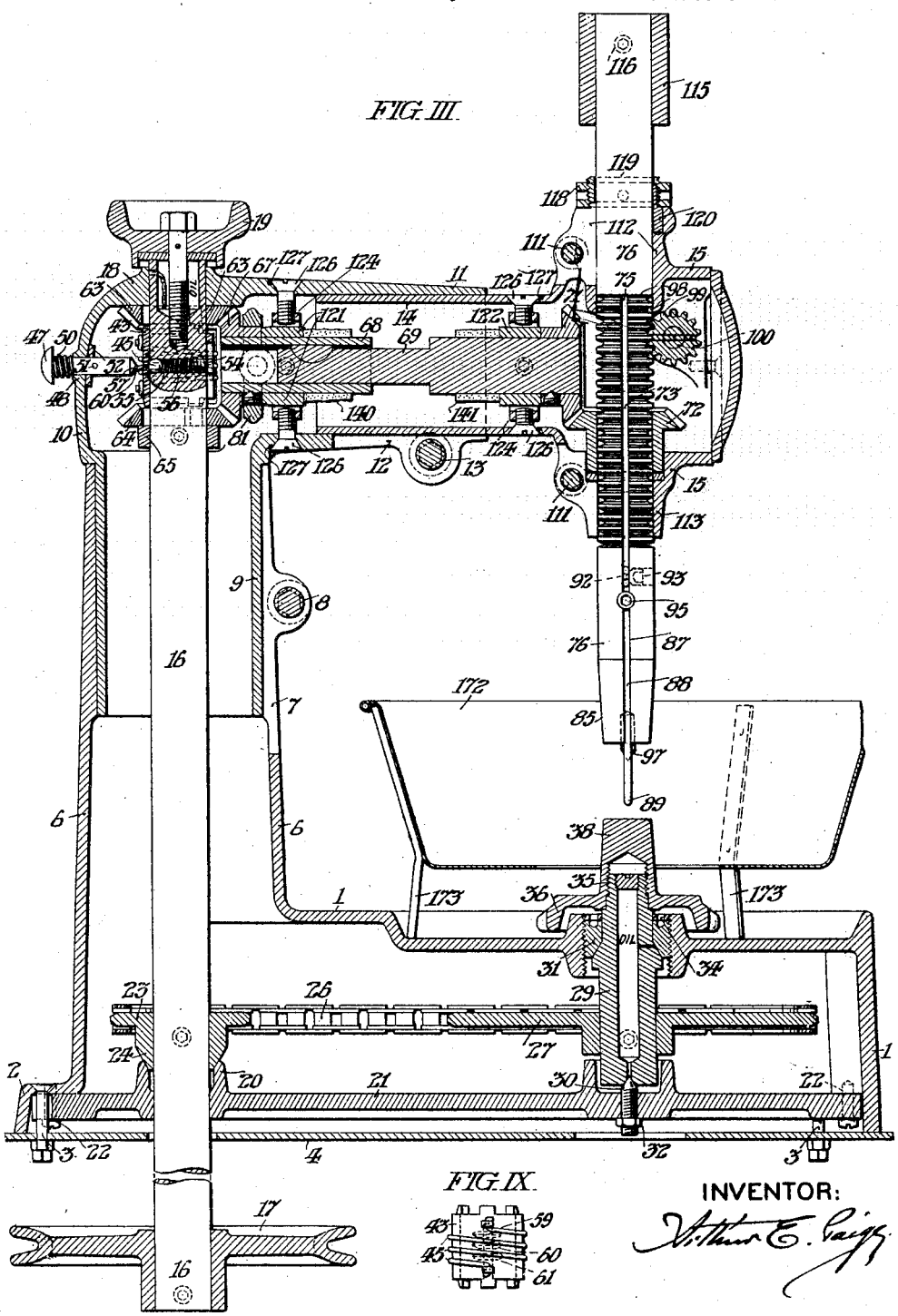

July 3, 1928.
A. E. PAIGE
1,675,862
SURFACING MECHANISM
Filed July 16, 1921
5 Sheets-Sheet 4
FIG. X.
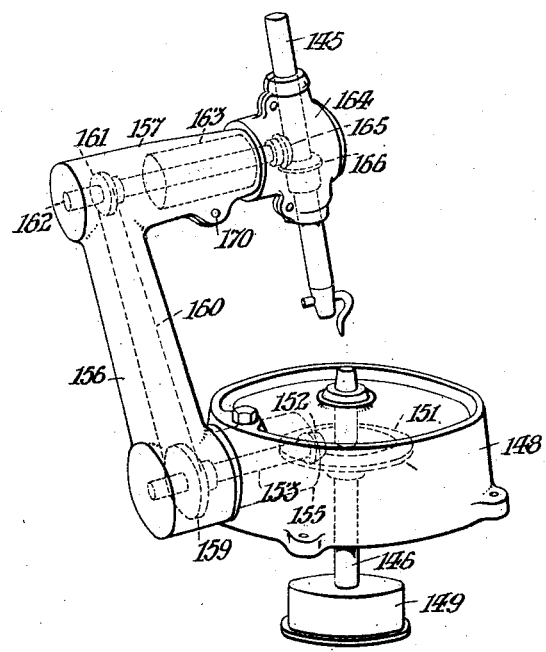
FIG. XI.
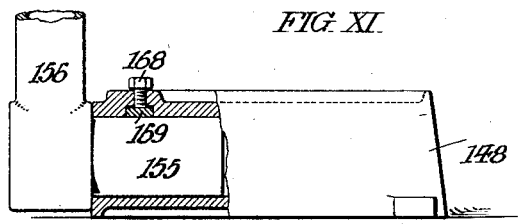
INVENTOR:
Arthur E. Paige.

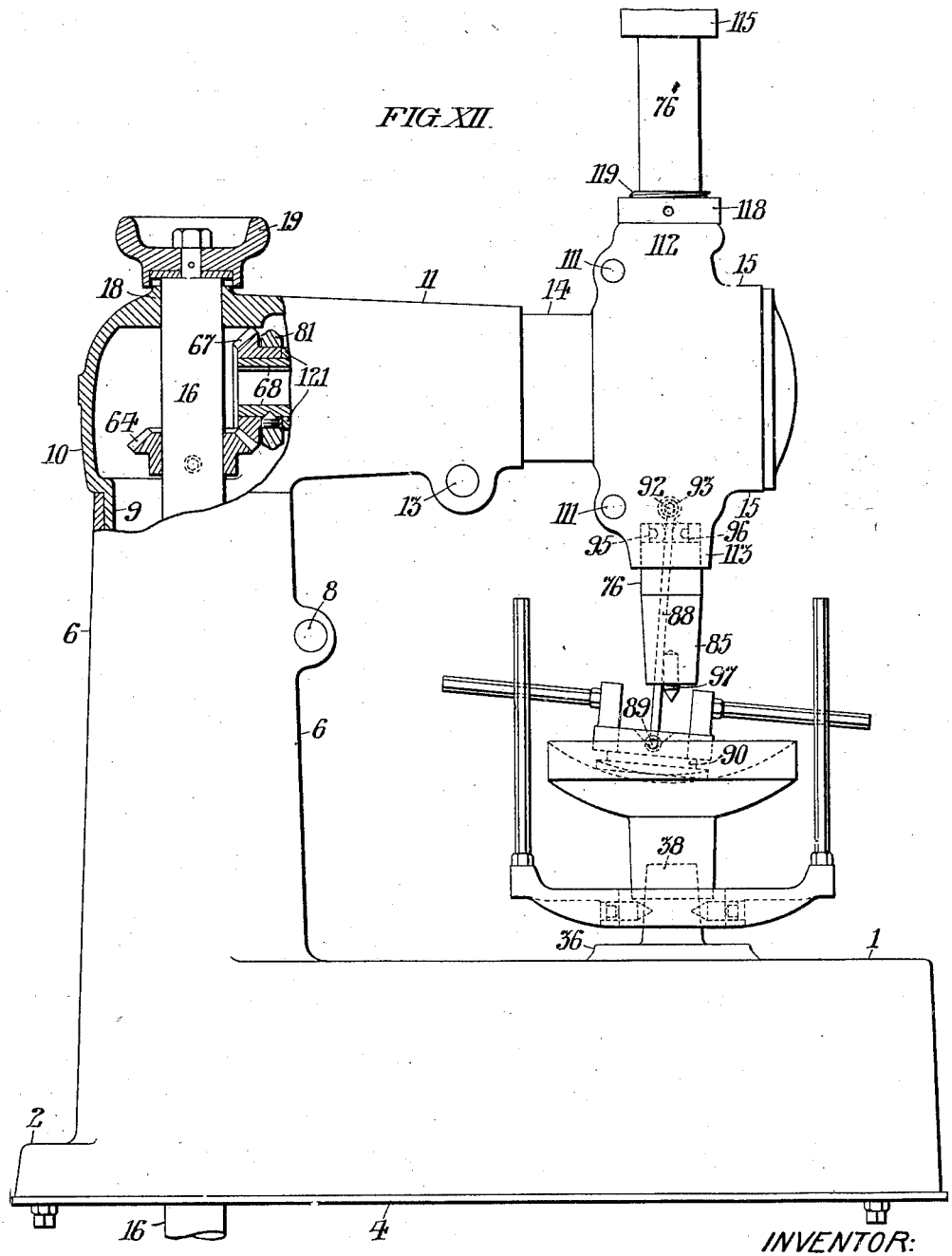

Patented July 3, 1928.

1,675,862

UNITED STATES PATENT OFFICE.

ARTHUR E. PAIGE, OF PHILADELPHIA, PENNSYLVANIA.

SURFACING MECHANISM.

Application filed July 16, 1921. Serial No. 485,314.

The mechanism herein claimed may be used for surfacing ophthalmic lenses of any kind, plane, prism, spherical, cylindrical, toric, etc., in accordance with any known method of operation, and is of the general class contemplated in my Letters Patent of the United States 1,260,022, granted March 19, 1918, and 1,269,568, granted June 11, 1918, in that it includes mechanism for supporting the material to be surfaced and the surfacing tools, whereby they may be relatively rotated in cooperative relation, and comprises means capable of precisely adjusting and maintaining the axes of rotation of the glass and tools in predetermined angular relation; such angular relation being variable, at the will of the operator, in accordance with the curvature of the surface which it is desired to generate; that is to say, the respective axes of rotation of the glass and abrading or polishing tool may be selectively held in axial alinement, or parallel to each other in spaced relation, or intersecting each other at an adjustably variable angle, and at an adjustably variable radius, and such tool may be rotated in concentric relation to the axis of rotation of the glass, or, the axis of rotation of such tool may intersect the surface of the glass at a point eccentric to the axis of rotation of the latter, so as to cause the tool to rotate in eccentric relation to the axis of rotation of the glass. Moreover, as said mechanism includes a rotary spindle having means arranged to carry a rotary surfacing tool with the axis of the latter eccentric to the axis of said spindle, such a tool may have a planetary movement with reference to the opposing tool.

However, the machine herein disclosed differs from those shown in my Letters Patent aforesaid in that the upper spindle and the mechanism for operating it, in connection with the lower spindle, is inclosed in an articulated hollow frame or housing, which is outwardly smooth so that it may be easily kept clean, and not only prevents access of abrasives to that mechanism, but prevents accidental sprinkling of abrasive upon the glass being surfaced.

The machine hereinafter described includes a lower rotary spindle which is axially immovable except for adjustment, and an upper rotary spindle which is axially movable automatically, to automatically proceed with any surfacing operation, without the constant attention of the operator, and laterally and angularly adjustable with respect to the lower spindle, so that it may be adjusted to surface lenses of all kinds and powers. The axial movement of the upper spindle may be precisely predetermined by setting a simple automatic feed and stop device, to automatically limit the thickness of glass to be ground off. Those spindles have means adapted to detachably hold and rotate surfacing tools, (for instance, any ordinary lap or glass holder) one above and the other below the glass to be surfaced. Both spindles have conical tips of standard taper; and a detachable crank device is provided for the upper spindle, including a crank bar which is radially adjustable, in a diametrical slot in that spindle, and has an axial bearing pin to detachably engage the upper tool at its axis of rotation, so that the eccentricity of that crank pin, and consequent cross movement of the tools, is variable by lateral adjustment of that bar.

My invention includes the various novel features of construction and arrangement hereinafter more definitely specified.

In said drawings: Fig. I is a front elevation of a machine embodying my invention. Fig. II is a plan view of said machine, with the upper and lower spindles in axial alinement. Fig. III is a central vertical sectional view of said machine. Fig. IV is a front elevation of the upper spindle in its housing, the latter being removed from the machine base. Fig. V is a plan view of the machine base and its appurtenances, the housing for the upper spindle being removed. Fig. VI is a transverse sectional view taken on the line VI, VI in Fig. II. Fig. VII is a transverse sectional view taken on the line VII, VII in Fig. II. Fig. VIII is an end view of the spring knob and its appurtenances shown in Figs. I, II and IV; whereby the upper spindle may be raised and lowered or yieldingly held in working position at any desired pressure. Fig. IX is a side elevation of the clutch sleeve shown in section in Fig. III. Fig. X is a diagrammatic perspective view of a machine embodying a modified form of my invention. Fig. XI is a fragmentary sectional view of the base of the machine shown in Fig. X. Fig. XII is a left hand side elevation of a machine similar to that shown in Figs. I and III, but partly sectioned to show a simplified form of driving mechanism for the upper spindle.

In said figures; the hollow machine base 1 has three lugs 2 for respective bolts 3 securing it to the bench top 4. The hollow vertical column 6 on said base 1 is split at 7 and provided with the clamp screw 8, to receive and hold the vertical cylindrical shank 9 of the hollow housing elbow 10 which has its horizontal arm 11 split at 12 and provided with the clamp screw 13 to receive and hold the horizontal cylindrical shank 14 of the hollow housing T 15; thus forming an articulated frame or housing which may be adjusted to any desired position and rigidly secured in such position.

The vertical driving shaft 16 has, rigidly secured thereon, the pulley 17 by which it may be rotated, conveniently by an electric motor provided with a rheostat or other means rendering it operative at variable speeds. Said shaft 16 extends through said column 6 and elbow 10; is journaled at its upper end in the bearing 18 in said elbow; and is provided at its upper end with the knob 19 by which it may be manually turned. As indicated in Fig. III; said knob has a screw which is normally tightly engaged in said shaft, at the bottom of the recess at the top of said shaft, which recess holds oil supplied to said bearing 18 through a wick extending in a radial opening in said shaft. Said shaft 16 is journaled at its lower end in the conical cup bearing 20 in the cross bar 21, which bar is detachably rigidly held in said base 1, by the screws 22. Said shaft 16 carries the sprocket gear 23 having its conical hub 24 fitting said cross bar bearing 20, which also holds grease. Said gear 23 engages the endless sprocket chain 26 which extends around the sprocket gear 27 fixed upon the lower spindle 29. Said spindle 29 is journaled between the opposite adjustable screw cone bearings 30 and 31; said bearing 30 being held in said cross bar 21 by the jam nut 32 and said bearing 31 being held in the bearing 33 in said base 1, by the jam screw ring 34.

Said lower spindle 29 has the standard screw thread 35 at its upper end, which is three-quarters of an inch in diameter and thus adapts said spindle to carry various commercial surfacing tools, which are provided with sockets for such a standard screw. However, said spindle 29 may be interchangeably provided with removable adapters, fitted to said thread 35. For instance, the adapter 36 has the smooth conical tip 38 of standard taper, fitting various commercial surfacing tools. Of course, other adapters may be substituted for it. However, said adapter 36 will hold upon said spindle 29 any ordinary toric surfacing tools, for instance, such a tool as shown in Fig. XII, provided with oscillatory parallel arms to engage the opposite radial arms of a toric lens holder engaged by the crank bar on the upper spindle, hereinafter described.

The grease cup 39, shown in Fig. V, projecting from said base 1 has the vent 40 arranged to continuously lubricate said chain 26, and the take-up spring 42, indicated in Fig. V, automatically maintains said chain taut.

Said vertical shaft 16 carries, within said frame elbow 10, the axially movable clutch sleeve 43 which carries the spiral spring 45 encircling it and acting as a flexible cam which engages the shift plunger 47 when the latter is pushed inward, in its bearing 48 in said elbow 10; said sleeve 43 being thereby shifted up or down by manually turning said shaft 16 in the proper direction. However, said plunger is normally withdrawn to the position shown in Fig. III, by its spring 50, the extent of its outward movement being limited by the cotter pin 51 and the washer 52.

As shown in Fig. III; said clutch sleeve 43 is prevented from turning on said shaft 16 by the screw stud 54 which plugs the transverse opening 55 in said shaft which holds the detent spring 56 and ball 57; said ball being adapted to selectively engage the three detent grooves 59, 60 and 61 in said sleeve; in accordance with the position to which the latter is set; said ball and its spring merely serving to prevent accidental displacement of said sleeve. As shown in Fig. III; said clutch sleeve 43 is mounted to reciprocate vertically upon said shaft 16 between the miter gears 63 and 64 which are both normally loose upon said shaft; said gear 64 being supported by the collar 65 which is fixed on said shaft 16. The arrangement is such that when said sleeve 43 is in its intermediate position, with its groove 60 engaged by said detent ball 57, both of said gears 63 and 64 are idle. But, when said clutch sleeve 43 is raised until its groove 61 is engaged by said ball 57, the three crown projections at the upper end of said sleeve engage corresponding recesses in said miter gear 63 so that the latter is positively driven by said shaft 16. On the contrary, when said sleeve 43 is lowered until its groove 59 is engaged by said detent ball 57, the three crown projections at the lower end of said sleeve engage corresponding recesses in said miter gear 64 so that said shaft positively drives that gear while said gear 63 remains idle. Said miter gears 63 and 64 oppositely engage the miter gear 67 fixed on the rear horizontal shaft section 68 which is keyed to, and telescopes on, the front horizontal shaft section 69. Said shaft section 69 carries, at its front end, within said hollow frame T 15, the miter gear 71, which is rigidly connected therewith and engages the miter gear 72 which is loosely journaled in said frame T 15 and has the key 73 fitting the keyway 75 in the upper spindle 76.

The arrangement above described is such that said spindles 29 and 76 may be simultaneously rotated in opposite directions by said driving shaft 16 and, ordinarily, said lower spindle 29 is turned anticlockwise, for the reason that such motion tends to tighten, rather than loosen, any adapter held upon its screw thread 35. However, both spindles may be simultaneously rotated anticlockwise, or the upper spindle 76 may be rendered idle, held stationary, or left free to be turned by hand, in accordance with the adjustment of said clutch sleeve 43.

The brake knob 78, shown in Fig. II, carries the screws 79 which extends loosely through the bearing 80 in said horizontal arm 11 of the housing elbow 10, but is screw threaded in the brake collar 81 encircling the hub of said gear 67, so that said knob may be turned to thrust the washer 82, at the inner end of said screw, against said hub and thus hold said horizontal shaft 68, 69 and said upper spindle 76 stationary, whenever said brake is thus applied. Of course, when said upper spindle is connected with the lower spindle by engagement of said clutch sleeve 43 with either of said miter gears 63 or 64; then the application of said brake prevents rotation of both spindles 76 and 29; so that they may be thus held stationary while tools are being put on or taken off them. Said brake knob 78 should always be unscrewed when it is desired to rotate said spindle 29 and 76 and, as I found in practice that the vibration incident to the operation of the machine tends to screw said knob inwardly; I encircle its screw with a split washer 83, indicated in Figs II and VI; which prevents the accidental application of said brake.

Said upper spindle has its lower tip 85 conically tapered like said tip 38 on said adapter 36 on the lower spindle to fit ordinary surfacing tools, such as the concave lap 86 shown in Fig. I, upon said lower spindle, but is also provided with the diametrical slot 87 to receive the transversely adjustable crank bar 88 having the axial bearing pin point 89 at its lower end, for engagement with a surfacing tool, lap or lens holder, for instance, the lens holder 90 shown in Fig. I, to impart a planetary motion to such tool. Such planetary motion causes the tool to which it is imparted to traverse all of the surface of the opposite tool and thus equalize the wear on the tools. Said crank bar 88 has the fulcrum socket 92, at its upper end, for pivotal engagement with the fulcrumed screw 93 which extends diametrically in said spindle 76, at right angles to said slot 87 and in engagement with said spindle. Said fulcrum screw has a hexagonal socket so that it may be turned by a suitable wrench. Said crank bar 88 may be oscillated upon said fulcrum screw 93 by and between the opposed screws 95 and 96, each in screw threaded engagement in said spindle 76, to vary the throw of the crank. Each of said screws 93, 95 and 96 may be manipulated by the same wrench and may be retracted, without projection from said spindle 76, to release said crank bar 88 and permit it to be withdrawn, when it is desired to fix any tool directly upon said tapered tip 85 of said spindle 76, or pivot a tool upon an axial cone pointed screw set in the lower end of said spindle 76.

Said upper spindle 76 has a longitudinal series of annular grooves 98, forming a gear rack, for engagement with the gear pinion 99 which is concealed within said hollow housing T 15 and rigidly connected with the spring shaft 100 which is journaled at each end in said housing, as indicated in dotted lines in Fig. IV. The spring knob 101 is loose on said spring shaft 100 but is connected therewith by the helical spring 103 which is held in said knob and has its outer end engaging said knob and its inner end engaging said shaft 100; so that by turning said knob 101, more or less spring pressure may be applied to turn said shaft 100 either to lift said upper spindle 76 to free the tool it carries, or to thrust it down with any degree of pressure required for a surfacing operation. Said spring is concealed within said knob by the cover plate 105, conveniently formed of thin spring steel, and secured by the screw 106 at the outer end of said shaft 100. Said knob 101 has the circular locking ratchet 108 at its inner face, exterior to said housing T 15, and having peripheral teeth like a gear, adapted to engage the stationary locking stud 109, which is a tapered pin driven in the adjacent face of said housing, as indicated in Fig. IV. Said knob 101 may be slid axially upon its shaft 100 to engage and disengage that stud, but is normally held in engagement therewith by said spring 103, which presses said knob axially inward. That is to say; when said knob 101 is drawn outward, to the extent of the engagement of said stud 109 with said ratchet 108, it is unlocked and may be turned, with said shaft 100, in either direction, to raise or lower said upper spindle 76, and, when said spindle is thus moved to any desired working position, said knob 101 may be turned upon said shaft 100 to apply more or less spring pressure upon said spindle, toward the work, and may be locked in any such selected position to maintain that selected pressure;

which pressure may be varied by adjustment of said knob while the machine is running, if desired.

Said upper spindle 76 may be adjusted in axial alinement with said lower spindle 29, or parallel thereto, or in any desired angular relation therewith, by turning said frame elbow 10 in said column 6, or turning said housing T 15 in said elbow, or sliding said T in or out, and be rigidly clamped in adjusted position by said clamp screws 8 and 13. However, when said articulated frame members are loosened, they may be swung aside, upon the axis of said vertical column 6, to carry said upper spindle out of the way and afford free access to the lower spindle 29, to reshape, with a carborundum stick or otherwise, the surfaces of tools carried by said lower spindle.

Each of said clamp screws 8 and 13 has a hexagon socket in its head, so that they may be adjusted by the same size wrench. Said housing T 15 is also split, and provided with two clamp screws 111, which are normally loose in said housing but may be tightened to reduce the diameter of the bearings 112 and 113 in which said upper spindle 76 is journaled; that adjustment being only used to compensate for ultimate wear of the parts.

In this connection; it may be observed that both said bearings 31, for said lower spindle 29, and the jam screw ring 34, have sockets to be engaged by a spanner wrench, and should be maintained so adjusted that said spindle 29 turns freely, but without sidewise movement. Said screws 111 have hexagonal sockets in their heads for adjustment by a suitable wrench.

For any surfacing operation in which it is desirable to precisely limit the axial movement of said upper spindle 76 toward the work, said spindle is provided with the automatic stop collar 115 which is manually adjustable thereon, but may be set in any desired position by the screw 116 which may be turned by the same wrench as the other screws aforesaid carried by said spindle. That affords a coarse adjustment; but a micrometer adjustment is afforded by the loose stop nut 118 which engages the stop screw sleeve 119, through which said upper spindle slides freely, but which sleeve is engaged and prevented from rotating by the stationary spline 120 projecting upwardly from said housing T 15, so that rotation of said nut 118 precisely raises or lowers said sleeve 119 with reference to the top of said housing, upon which said nut rests; thus affording an accurately adjustable abutment for said stop collar 115. That automatic stop mechanism, consisting of said collar 115, nut 118, screw sleeve 119, and spline 120, may be instantly attached or detached with respect to said machine.

Said horizontal shaft sections 68 and 69 are respectively journaled in the gimbal bearing 121 in said elbow 10 and in the gimbal bearing 122 in said housing T 15. As shown in Fig. VII, said bearing 121 is pivoted upon the horizontal axis common to the pointed screws 123 which are carried by the resilient ring 124, and said ring 124 is pivoted upon the vertical axis common to the flat headed screws 126 which extend through the horizontal arm 11 of said frame elbow 10. The arrangement is such that said screws 123 and 126 may be used to precisely adjust said bearing 121 and accidental displacement of said screws be prevented by any convenient means. For instance, as indicated in Figs. II and III, holes 127 may be drilled in said arm 11 at the edge of the heads of said screws 126 and the latter bent therein by a center-punch. Such a punch may also be employed to upset the metal of the ring 124 against the screws 123 to prevent their displacement. Said bearing 122 is similarly constructed; being pivoted upon the horizontal axis common to the cone pointed screws 130 which are carried in the resilient ring 131 which is pivoted upon the vertical axis common to the flat head screws 132 which extend through the shank 14 of said housing T 15, as shown in Fig. III. Such construction not only facilitates the primary assembling of said horizontal shaft and its gears in proper relation with said vertical driving shaft and its gears, but is such that said housing T 15 may be adjusted toward and away from said base column 6, for the purpose of presenting the axis of the upper spindle in a plane in which the axis of the lower spindle extends; regardless of the angular position to which said upper spindle may be adjusted. However, it is to be noted that although such precise relative location of the axes of said spindles is important when either of said spindles is employed to operate a ring grinding tool held in rigid relation therewith; it is not essential to the operation of either spindle for ordinary lap grinding or polishing, although such precise adjustment minimizes the lost motion incident to such an operation as is illustrated in Fig. I, wherein the upper spindle 76 and its appurtenances are adjusted to carry the upper tool 90 in a planetary path with respect to the lower tool 86 mounted upon the lower spindle 29; said upper tool being a lens holder, and said lower tool an ordinary concave spherical lap; said lens holder being free to oscillate upon its axial bearing 89 carried by said upper spindle 76.

When the articulated housing above described is adjusted to present the axis of the upper spindle in alinement with the axis of the lower spindle, as in Fig. II; the axis of said upper spindle is at the radius indicated by the arcual dot and dash line 134, concentric with the axis of rotation of said elbow 10 in said vertical column 6. However, in adjusting the upper spindle 76 to the angular position indicated in Fig. I; from the position shown in Fig. II; it is necessary to turn said elbow 10 until the axis of its horizontal arm 11 is in the position indicated by the straight dash line 135 radiating from the axis of said column 6, and to shift said housing T 15 toward said column 6; thus thrusting the shank 14 of said T 15 further into the arm 11 of said elbow 10 and shortening the radial distance of the axis of said spindle 76 from the axis of said column 6, until said distance is the radius of the arcual dash line 137 in Fig. II, concentric with the axis of said column 6. Such adjustment not only telescopes the frame housing members 11 and 14, as above described, but also telescopes said horizontal shaft sections 68 and 69, and brings the axis of said upper spindle 76, indicated by the straight dash line 138 in Fig. II, into a vertical plane which plane is then common to the axes of both said spindles 29 and 76, although those axes are then also in the angular relation indicated in Fig. I.

Said housing T 15 may be entirely withdrawn, from said elbow 10, to afford access to both of said bearings 121 and 122, to oil their respective wick rings 140 and 141, which constantly lubricate said shaft sections 68 and 69, at their respective bearings aforesaid.

I have illustrated, in Figs. I to IX inclusive, a preferable complex form of my invention, but it is to be understood that other modifications thereof may be employed. For instance, I have constructed simpler machines differing from that one, and as shown in Fig. XII in that they do not include the clutch 43 and its appurtenances, or the miter gear 63. In each of those machines; the gear 64 is rigidly connected with the rear shaft 16 and in constant engagement with the gear 67; so that both the lower and upper spindles are simultaneously operated.

In both types of machines last above mentioned, it is necessary to adjust the T housing 15 of the upper spindle radially in the horizontal arm 11 of the housing elbow 10, in accordance with any change in the angular position of said spindle, to bring its axis in the same plane with the axis of the lower spindle because such changes in the angular position of said upper spindle 76 are in part effected by turning said elbow 10 upon the vertical axis of its shank 9 in the base column 6. However, in the modified form of my invention shown in Figs. X and XI; the axis of the upper spindle 145 is constantly maintained in the same plane as the axis of the lower spindle 146, regardless of variations in the angular position of said upper spindle. As indicated in Fig. X, said spindle 146 is journaled in the base 148 and provided with the belt wheel 149 by which it may be rotated. Said spindle 146 carries the bevel gear 151 which engages the bevel gear 152 carried by the horizontal shaft 153, extending radially with respect to said spindle 146 and journaled in the horizontal shank 155 of the hollow housing member 156, which is a double elbow having its upper arm 157 split longitudinally, like the arm 11 aforesaid, and extending parallel with its lower shank 155. Said shaft 153 carries the sprocket wheel 159 which is connected by the chain 160 with the sprocket wheel 161 carried by the horizontal shaft 162 which shaft is journaled, at its outer end, in said housing arm 157, parallel with said shaft 153. Said shaft 162 is journaled at its inner end in the cylindrical shank 163 of the T housing 164 which is mounted in said arm 157, in concentric relation with the axis of said shaft 162. Said shaft 162 carries, at its inner end, the bevel gear 165, which engages the bevel gear 166 which is loosely journaled in said T housing 164, and keyed upon said upper spindle 145, which is thus capable of longitudinal reciprocation in said gear 166, like the upper spindle 76 above described.

When released, the articulated housing shown in Fig. X may be swung to any desired position to bring the axis of the upper spindle 145 into the required angular relation with the axis of the lower spindle 146. Thereupon, said double elbow housing 156 may be clamped in adjusted position by the set screw 168 which thrusts the shoe 169 against the shank 155 of said housing member, as indicated in Fig. XI. Said housing T 164 may be clamped in adjusted position by the set screw 170, by which the split portion of said arm 157 may be constricted upon said shank 163 of said housing 164. In other words, by releasing said set screws 168 and 170, the articulated housing shown in Fig. X is released so that the upper spindle may be adjusted to any desired angular position, in axial alinement with the lower spindle 146, parallel thereto, or at any desired angle in relation to the axis of said lower spindle 146 and, said screws 168 and 170 may be then set to hold said articulated housing in rigid relation with said base 148, until said screws 168 and 170 are again released. It is to be understood that said upper spindle 145 shown in Fig. X may be raised and lowered by such means as above described for effecting reciprocation of the upper spindle 76 and be similarly maintained under spring pressure toward the article being surfaced.

Of course, the surfacing operations herein contemplated are effected by the use of comminuted abrasive material mixed with water and the so-called centrifugal force generated by rotation of the surfacing tools tends to throw off such material, which, on the contrary, it is desirable to retain. Therefore, it is advantageous to rotate both of the opposed spindles so that the desired relative rate of rotation may be attained with the minimum speed of rotation of each spindle. However, in each form of my invention described; I perfer to rotate the lower spindle at a much slower rate than the upper spindle when cooperatively connected therewith; the ratio of the relative rotations of said two spindles being such that one does not bear an aliquot relation to the other, for instance, the pitch diameters of said sprocket gears 23 and 27 are as thirteen to forty respectively. The reason for such arrangement is that if said spindles rotate in any aliquot relation, there is a tendency to unequally surface the glass or other material worked upon, by the repeated progression of the same opposite parts of the tools and glass in the same paths with respect to each other; thus forming a geometrical pattern of scratches. However, with due regard to such considerations, various modifications may be made in the relative arrangement of said two spindles, to attain the maximum efficiency of any surfacing operation.

Each of said base frames 1 and 148 has an annular flange surrounding the spindle bearing therein, arranged to retain liquid and abrasive dropped on such base. However, I prefer to also use removable pans such as indicated at 172 in Fig. III, each provided with three legs 173, so that they may be removably held within such annular flanges on said base members, to prevent splashing such abrasive material.

Although in each form of my invention illustrated, I have found it convenient to locate the belt wheel by which the machine is driven below the bench which supports the machine; it is to be understood that such machines may be otherwise driven. For instance, in the form of my invention shown in Figs. I and III; the driving shaft 16 may end above the bench top 4 and be provided at its upper end with a belt wheel to drive it, in lieu of said knob 19. Such an arrangement is advantageous in that machines thus equipped may be repeatedly rearranged in connection with a bench without perforating the latter.

It may be observed that in each type of machine I have illustrated, the articulated housing supporting the upper spindle includes two levers, to wit, in the machines shown in Figs. III and XII; the elbow 10 is one lever, and the T housing 15 the other lever. In the machine shown in Fig. X, the housing member 156 is a lever fulcrumed in the base 148, and the T housing 164 is a lever fulcrumed in said housing 156.

Therefore, I do not desire to limit myself to the precise details of construction and arrangement herein set forth, as it is obvious that various modifications may be made therein, without departing from the essential features of my invention, as defined in the appended claims.

I claim:

1. In surfacing mechanism, the combination with a hollow articulated frame, including members capable of relative rotation and oscillation; of two spindles mounted to rotate in said frame and adapted to carry surfacing tools; the members of said frame being arranged for relative adjustment to present said spindles in different relative angular positions; means carried by said frame arranged to clamp the members thereof in adjusted position; and driving mechanism inclosed by said frame, arranged to connect said spindles in cooperative relation, including a driving shaft parallel with one of said spindles, and two bevel gears carried by and independently rotatable upon said shaft; clutch mechanism carried by said shaft arranged to selectively connect either of said gears with said shaft, to positively drive the gear thus connected; a shaft journaled in said frame transversely to said driving shaft and having a bevel gear in mesh with both of said gears on said driving shaft; said transverse shaft having means operatively connecting it with one of said spindles, including a gear on that spindle arranged to permit that spindle to be reciprocated therein; and means arranged to be manually operated to reciprocate that spindle including a rack comprising a series of coaxial teeth formed by a longitudinal series of circular grooves therein, a gear wheel fitted to said rack, within said frame, a spring shaft for the last named gear wheel, a knob carried by the last named shaft but free to turn thereon; and a spring connecting that shaft with said knob; whereby said spindle may be resiliently reciprocated by turning said knob, to cause said spring to turn said shaft; a detent ratchet carried by said knob, including a series of teeth concentric with its shaft; and a detent stud carried by said frame arranged to engage and hold said ratchet in any position of adjustment of said knob; whereby said knob may be temporarily detained from turning, to apply the pressure of said spring upon said spindle toward the article to be surfaced; adjustable stop mechanism arranged to variably limit the movement of said spring pressed spindle toward the work, including a collar adjustable longitudinally on said spindle; a screw sleeve encircling said spindle, a spline extending from said frame in engagement with said sleeve, preventing rotation of the latter, and a nut engaging said sleeve and bearing upon said frame, rotatable to adjust said sleeve toward and away from said frame.

2. In surfacing mechanism, the combination with a hollow articulated frame, including members capable of relative movement; of two spindles mounted to rotate in said frame and adapted to carry surfacing tools; the members of said frame being arranged for relative adjustment to present said spindles in different relative angular positions; means carried by said frame arranged to clamp the members thereof in adjusted position; and driving mechanism inclosed by said frame, arranged to connect said spindles in cooperative relation, including a driving shaft parallel with one of said spindles, and two bevel gears carried by and independently rotatable upon said shaft; clutch mechanism carried by said shaft arranged to selectively connect either of said gears with said shaft, to positively drive the gear thus connected; a shaft journaled in said frame transversely to said driving shaft and having a bevel gear in mesh with both of said gears on said driving shaft; said transverse shaft having means operatively connecting it with one of said spindles, including a gear on that spindle arranged to permit that spindle to be reciprocated therein; and means arranged to be manually operated to reciprocate that spindle including a rack comprising a series of teeth formed by a longitudinal series of circular grooves therein, a gear wheel fitted to said rack, within said frame, a spring shaft for the last named gear wheel, a knob carried by the last named shaft but free to turn thereon; and a spring connecting that shaft with said knob; whereby said spindle may be resiliently reciprocated by turning said knob, to cause said spring to turn said shaft; a detent ratchet carried by said knob, including a series of teeth concentric with its shaft; and a detent stud carried by said frame arranged to engage and hold said ratchet in any position of adjustment of said knob; whereby said knob may be temporarily detained from turning to apply the pressure of said spring upon said spindle toward the article to be surfaced.

3. In surfacing mechanism, the combination with a hollow articulated frame, including members capable of relative movement; of two spindles mounted to rotate in said frame and adapted to carry surfacing tools; the members of said frame being arranged for relative adjustment to present said spindles in different relative angular positions; means carried by said frame arranged to clamp the members thereof in adjusted position; and driving mechanism inclosed by said frame, arranged to connect said spindles in cooperative relation, including a driving shaft parallel with one of said spindles, and a bevel gear on said shaft; a shaft journaled in said frame transversely to said driving shaft and having a bevel gear in mesh with said gear on said driving shaft; said transverse shaft having means operatively connecting it with one of said spindles, including a gear on that spindle arranged to permit that spindle to be reciprocated therein; and means arranged to be manually operated to reciprocate that spindle including a rack comprising a series of teeth formed by a longitudinal series of circular grooves therein, a gear wheel fitted to said rack, within said frame, a spring shaft for the last named gear wheel, a knob carried by the last named shaft but free to turn thereon; and a spring connecting that shaft with said knob; whereby said spindle may be resiliently reciprocated by turning said knob, to cause said spring to turn said shaft; a detent ratchet carried by said knob, including a series of teeth concentric with its shaft; and a detent stud carried by said frame arranged to engage and hold said ratchet in any position of adjustment of said knob; whereby said knob may be temporarily detained from turning to apply the pressure of said spring upon said spindle toward the article to be surfaced.

4. In surfacing mechanism, the combination with a hollow articulated frame, including members capable of relative movement; of two spindles mounted to rotate in said frame and adapted to carry surfacing tools; the members of said frame being arranged for relative adjustment to present said spindles in different relative angular positions; means carried by said frame arranged to clamp the members thereof in adjusted position; and driving mechanism inclosed by said frame, arranged to connect said spindles in cooperative relation, including a driving shaft parallel with one of said spindles, a sprocket wheel on that shaft, a sprocket wheel on that spindle, and a chain connecting said sprocket wheels; means arranged to be manually operated to reciprocate one of said spindles including a rack comprising a series of teeth formed by a longitudinal series of circular grooves therein, a gear wheel fitted to said rack, within said frame, a spring shaft for the last named gear wheel, a knob carried by the last named shaft but free to turn thereon; a spring connecting that shaft with said knob; whereby said spindle may be resiliently reciprocated by turning said knob, to cause said spring to turn said shaft; and means arranged to adjustably vary the pressure of said spring on that spindle.

5. In surfacing mechanism, the combination with a hollow articulated frame, including relatively movable members; of two spindles mounted to rotate in said frame and adapted to carry surfacing tools; the members of said frame being arranged for relative adjustment to present said spindles in different relative angular positions; means carried by said frame arranged to clamp the members thereof in adjusted position; and driving mechanism inclosed by said frame, arranged to connect said spindles in cooperative relation; means arranged to variably spring press one of said spindles toward the work; and adjustable stop mechanism arranged to variably limit the movement of said spring pressed spindle, toward the work, including a collar adjustable longitudinally on said spindle; a screw sleeve encircling said spindle, a spline extending from said frame in engagement with said sleeve, preventing rotation of the latter, and a nut engaging said sleeve and bearing upon said frame, rotatable to adjust said sleeve toward and away from said frame.

6. In surfacing mechanism, the combination with a hollow articulated frame, including relatively movable members; of two spindles mounted to rotate in said frame and adapted to carry surfacing tools; the members of said frame being arranged for relative adjustment to present said spindles in diffirent relative angular positions; means carried by said frame arranged to clamp the members thereof in adjusted position; and driving mechanism inclosed by said frame, arranged to connect said spindles in cooperative relation; means arranged to variably spring press one of said spindles toward the work; and adjustable stop mechanism arranged to variably limit the movement of said spring pressed spindle, toward the work.

7. In surfacing mechanism, the combination with a frame, of a spindle mounted to rotate and reciprocate in said frame and adapted to carry surfacing tools; and means arranged to be manually operated to reciprocate said spindle including a rack comprising a series of teeth formed by a longitudinal series of circular grooves therein, a gear wheel fitted to said rack, a spring shaft for the last named gear wheel, a knob carried by said last named shaft but free to turn thereon; and a spring connecting that shaft with said knob; whereby said spindle may be resiliently reciprocated by turning said knob, to cause said spring to turn said shaft; a detent ratchet carried by said knob, including a series of teeth concentric with its shaft; and a detent stud carried by said frame arranged to engage and hold said ratchet in any position of adjustment of said knob; whereby said knob may be temporarily detained from turning to apply the pressure of said spring upon said spindle toward the article to be surfaced; adjustable stop mechanism arranged to variably limit the movement of said spring pressed spindle toward the work, including a collar adjustable longitudinally on said spindle; a screw sleeve encircling said spindle, a spline extending from said frame in engagement with said sleeve, preventing rotation of the latter, and a nut engaging said sleeve and bearing upon said frame, rotatable to adjust said sleeve toward and away from said frame.

8. In surfacing mechanism, the combination with a frame, of a spindle mounted to rotate and reciprocate in said frame and adapted to carry surfacing tools; and means arranged to be manually operated to reciprocate said spindles including a rack comprising a series of teeth formed by a longitudinal series of circular grooves therein, a gear wheel fitted to said rack, a spring shaft for the last named gear wheel, a knob carried by said last named shaft but free to turn thereon; and a spring connecting that shaft with said knob; whereby said spindle may be resiliently reciprocated by turning said knob, to cause said spring to turn said shaft; a detent ratchet carried by said knob, including a series of teeth concentric with its shaft; and a detent stud carried by said frame arranged to engage and hold said ratchet in any position of adjustment of said knob; whereby said knob may be temporarily detained from turning to apply the pressure of said spring upon said spindle toward the article to be surfaced.

9. In surfacing mechanism, the combination with a frame, of a spindle mounted to rotate and reciprocate in said frame and adapted to carry surfacing tools; and means arranged to be manually operated to reciprocate said spindle including a rack comprising a series of teeth formed by a longitudinal series of circular grooves therein, a gear wheel fitted to said rack, a spring shaft for the last named gear wheel, a knob carried by said last named shaft but free to turn thereon; and a spring connecting that shaft with said knob; whereby said spindle may be resiliently reciprocated by turning said knob, to cause said spring to turn said shaft; and means arranged to detain said knob in adjusted position.

10. In surfacing mechanism, the combination with a hollow articulated frame, including a base having a vertical spindle bearing and a vertical column; said column being split and provided with clamping means to contract it; an elbow having a cylindrical shank fitted to turn in said column, and an arm extending transversely thereto; said arm being split and provided with clamping means to contract it, and a T housing having a cylindrical shank fitted to turn in said arm, and a spindle bearing extending transversely to the axis of said shank; of two spindles mounted to rotate in said frame, respectively in said base bearing and in said T bearing and adapted to carry surfacing tools; and driving mechanism inclosed by said frame, arranged to connect said spindles in cooperative relation, including a driving shaft in coaxial relation with said column, a transverse shaft in coaxial relation with said elbow arm; and clutch means arranged to connect said transverse shaft with said driving shaft, to turn in either direction with respect to the direction of rotation of said driving shaft and to disconnect said shafts.

11. In surfacing mechanism, the combination with a hollow articulated frame, including a base having a vertical spindle bearing and a vertical column; said column being split and provided with clamping means to contract it; an elbow having a cylindrical shank fitted to turn in said column, and an arm extending transversely thereto; said arm being split and provided with clamping means to contract it, and a T housing having a cylindrical shank fitted to turn in said arm, and a spindle bearing extending transversely to the axis of said shank; of two spindles mounted to rotate in said frame, respectively in said base bearing and in said T bearing and adapted to carry surfacing tools; and driving mechanism inclosed by said frame, arranged to connect said spindles in cooperative relation, including a driving shaft in coaxial relation with said column, a transverse shaft in coaxial relation with said elbow arm.

12. In surfacing mechanism, the combination with a hollow articulated frame, including a base having a vertical spindle bearing and a vertical column; said column being split and provided with clamping means to contract it; an elbow having a cylindrical shank fitted to turn in said column, and an arm extending transversely thereto; said arm being split and provided with clamping means to contract it; and a T housing having a cylindrical shank fitted to turn in said arm, and a spindle bearing extending transversely to the axis of said shank; of two spindles mounted to rotate in said frame, respectively in said base bearing and in said T bearing and adapted to carry surfacing tools; and driving mechanism inclosed by said frame, arranged to connect said spindles in cooperative relation.

13. In surfacing mechanism, the combination with a hollow articulated frame, including a base having a vertical spindle bearing and a vertical column; an elbow having a cylindrical shank fitted to turn in said column, and an arm extending transversely thereto; and a T housing having a cylindrical shank fitted to turn in said arm, and a spindle bearing extending transversely to the axis of said shank; of means arranged to clamp said frame member in adjusted position; two spindles mounted to rotate in said frame, respectively in said base bearing and in said T bearing and adapted to carry surfacing tools; and driving mechanism inclosed by said frame, arranged to connect said spindles in cooperative relation, including a driving shaft in coaxial relation with said column, and a transverse shaft in coaxial relation with said elbow arm.

14. In surfacing mechanism, the combination with a hollow articulated frame, including a base having a vertical spindle bearing and a vertical column; an elbow having a cylindrical shank fitted to turn in said column, and an arm extending transversely thereto; and a T housing having a cylindrical shank fitted to turn in said arm, and a spindle bearing extending transversely to the axis of said shank; of means arranged to clamp said frame member in adjusted position; two spindles mounted to rotate in said frame, respectively in said base bearing and in said T bearing and adapted to carry surfacing tools; and driving mechanism inclosed by said frame, arranged to connect said spindles in cooperative relation.

15. In surfacing mechanism, the combination with a hollow articulated frame, including a base having a vertical spindle bearing, and a sylindrical bearing for a frame elbow; of an elbow having a cylindrical shank fitted to turn in said base and an arm with a cylindrical bearing for a T housing; a T housing having a cylindrical shank fitted to turn in said arm, and a spindle bearing extending transversely to the axis of said shank; means arranged to clamp said frame members in adjusted position; two spindles mounted to rotate in said frame, respectively in said base bearing and in said T bearing and adapted to carry surfacing tools; and driving mechanism inclosed by said frame, arranged to connect said spindles in cooperative relation.

16. In surfacing mechanism, the combination with a hollow articulated frame, including relatively movable members; of two spindles mounted to rotate in said frame and adapted to carry surfacing tools; the members of said frame being arranged for relative adjustment to present said spindles in different relative angular positions; means carried by said frame arranged to clamp the members thereof in adjusted position; and driving mechanism inclosed by said frame, arranged to connect said spindles in cooperative relation, including a shaft; gimbal bearings in said frame, for said shaft; and means, including screws accessible from the exterior of said frame, whereby said gimbal bearings may be relatively adjusted.

17. In surfacing mechanism, the combination with a hollow articulated frame, including relatively movable members; of two spindles mounted to rotate in said frame and adapted to carry surfacing tools; the members of said frame being arranged for relative adjustment to present said spindles in different relative angular positions; means carried by said frame arranged to clamp the members thereof in adjusted position; driving mechanism inclosed by said frame, arranged to connect said spindles in cooperative relation, including a shaft; and brake mechanism arranged to temporarily prevent rotation of said shaft, including a brake collar, in concentric relation with said shaft, and means arranged to clamp said collar.

18. In surfacing mechanism, the combination with a hollow articulated frame, including relatively movable members; of two spindles mounted to rotate in said frame and adapted to carry surfacing tools; the members of said frame being arranged for relative adjustment to present said spindles in different relative angular positions; means carried by said frame arranged to clamp the members thereof in adjusted position; driving mechanism inclosed by said frame, arranged to connect said spindles in cooperative relation, including a shaft; and brake mechanism arranged to temporarily prevent rotation of said shaft.

In testimony whereof, I have hereunto signed my name at Philadelphia, Pennsylvania, this sixteenth day of July, 1921.

ARTHUR E. PAIGE.